United States Patent [19]

Takahashi et al.

[11] Patent Number: 5,061,736
[45] Date of Patent: Oct. 29, 1991

[54] FOAMABLE SILICONE RUBBER COMPOSITION

[75] Inventors: Masaharu Takahashi; Jun Hatakeyama, both of Gunma, Japan

[73] Assignee: Shin-Etsu Chemical Co., Ltd., Tokyo, Japan

[21] Appl. No.: 696,390

[22] Filed: May 6, 1991

[30] Foreign Application Priority Data

| May 7, 1990 | [JP] | Japan | 2-117417 |
| Jul. 6, 1990 | [JP] | Japan | 2-179184 |
| Jul. 6, 1990 | [JP] | Japan | 2-179185 |

[51] Int. Cl.$^5$ .............................................. C08J 9/02
[52] U.S. Cl. ..................................... 521/91; 264/25; 521/92; 521/154; 521/915; 521/96
[58] Field of Search ............... 521/91, 92, 154, 96, 521/915

[56] References Cited

U.S. PATENT DOCUMENTS 4,980,384  12/1990  Takahashi et al. ............... 521/154

Primary Examiner—Morton Foelak
Attorney, Agent, or Firm—Millen, White & Zelano

[57] ABSTRACT

The foamable silicone rubber composition is capable of giving a cured silicone rubber body having a cellular structure and suitable for use as a very reliable fire-resistant joint-sealing member in buildings. In addition to the rather conventional constituents essential in a foamable silicone rubber composition of prior art including (a) a diorganopolysiloxane, (b) a finely divided reinforcing silica filer, (f) a curing agent and (g) a blowing agent, the foamed silicone rubber body obtained by curing the inventive composition is imparted with very reliable fire resistance by virtue of the synergistic effect of the characteristic ingredients including (c) a ferrite powder, (d) a finely divided inorganic material or, in particular, mica flakes, and (e) a platinum compound, in combination, each in a specified amount.

18 Claims, 2 Drawing Sheets

FOAMABLE SILICONE RUBBER COMPOSITION

BACKGROUND OF THE INVENTION

The present invention relates to a foamable silicone rubber composition capable of giving a cured silicone rubber having a cellular structure. More particularly, the invention relates to a foamable silicone rubber composition capable of giving a cured cellular silicone rubber body having excellent mechanical properties and good stability retaining the initial dimensions and forms even at a high temperature so as to be useful as a fire-resistant joint-sealing member in buildings and the like. The invention also relates to a cellular silicone rubber body obtained by foaming and curing the foamable silicone rubber composition.

The most traditional material used as a fire-resistant joint-sealing member in buildings is an asbestos-based cellular body which is recognized to satisfy the statutory standard for fire-resistant mate-rials in buildings. This traditional material, however, is destined to be entirely banned in the near future in view of the carcinogenicity of asbestos to cause lung cancers. Accordingly, it is eagerly desired to develop a substitute for the asbestos-based cellular body suitable as a fire-resistant joint-sealing member in buildings without the problems on the human health.

Various proposals and attempts have been made hitherto for such a fire-resistant joint-sealing material and, among the various materials thus far proposed, silicone rubber-based ones are considered to be the most promising. Although silicone rubbers are absolutely harmless against not only human bodies but also any animals, the conventional silicone rubber-based materials are not quite satisfactory in respect of the dimensional stability at high temperatures when the material is exposed to fire. When a silicone rubber body is kept in an atmosphere at a temperature gradually increasing from room temperature, for example, the body gradually expands as the temperature is increased up to around 400° C. and then causes rapid expansion or shrinkage in the range of 400° to 600° C. resulting in irregular changes in the dimensions of the rubber body while the dimensional change of the rubber body is toward shrinkage when the temperature is further increased above 600° C. In the temperature range exceeding 400° C., thermal cracking may take place in the molecular structure of the organopolysiloxane as the principal ingredient of the silicone rubber not only in the chemical bonds between the silicon atoms and the organic groups but also in the siloxane linkages to form low molecular-weight combustible gaseous decomposition products. Once such a gas is produced within the silicone rubber body, cracks are formed unavoidably inside the body while the cracks are enlarged along with the shrinkage of the rubber body per se. Needless to say, the cracks having substantial broadness permit flames to pass therethrough or lead to eventual falling of the joint-sealing member as a whole increasing the danger of fire spreading. Thus, these silicone rubber-based joint-sealing materials are desired to be improved in respect of the stability at high temperatures so that spreading of fire can be reliably prevented thereby.

Japanese Patent Publication 63-191841 teaches that a silicone rubber-based fire-resistant joint-sealing material for buildings can be imparted with improved fire resistance by the admixture of the silicone rubber composition with a platinum compound in an amount up to 2000 ppm by weight and a ceramic-forming agent in an amount of 5 to 45% by weight. The improvement obtained by this means is still not high enough so that, when the joint-sealing member is subjected to a high-level test for fire-proofness to withstand prolonged exposure to fire for 3 hours, formation of cracks is noted or interstices are formed between the sealing member and the substrate body of the building not to prevent fire spreading therethrough.

SUMMARY OF THE INVENTION

The present invention accordingly has an object to provide a novel and improved foamable silicone rubber composition capable of giving a cellular cured silicone rubber body useful as a fire-resistant joint-sealing member without the above described problems and disadvantages in the prior art materials.

Thus, the foamable silicone rubber composition of the present invention comprises, as a blend:

(a) 100 parts by weight of a diorganopolysiloxane represented by the average unit formula $$R_a SiO_{(4-a)/2}, \qquad (I)$$

in which R is an unsubstituted or substituted monovalent hydrocarbon group and the subscript a is a positive number of 1.98 to 2.02;

(b) from 10 to 70 parts by weight of a finely divided reinforcing silica filler having a specific surface area of at least 50 $m^2/g$;

(c) from 20 to 150 parts by weight of a powder of a ferrite having a chemical composition expressed by the general formula $$MO \cdot Fe_2O_3, \qquad (II)$$

in which M denotes a divalent metallic element selected from the group consisting of manganese, copper, nickel, magnesium, cobalt, zinc and iron;

(d) from 10 to 70 parts by weight of a finely divided particulate, flaky or fibrous inorganic material selected from the group consisting of flakes of mica or sericite, fibers of ceramics and glass powders;

(e) finely divided platinum metal or a platinum compound in an amount in the range from 1 to 2000 ppm by weight as platinum metal based on the diorganopolysiloxane as the component (a);

(f) a curing agent of silicone rubbers in an amount sufficient to cure the composition; and (g) a blowing agent in an amount sufficient to produce a cellular structure of the composition by curing.

DETAILED DESCRIPTION OF THE PREFERRED EMBODIMENTS

Figure 1:
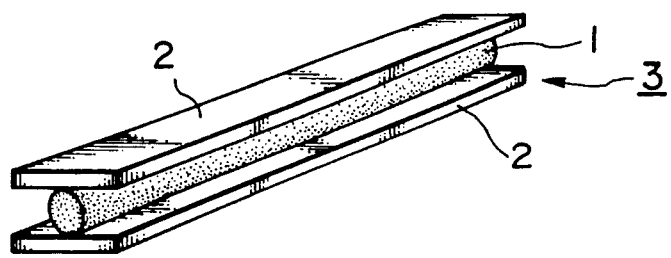
FIG. 1 is a perspective view of a specimen for the fire-resistance test of the cellular silicone rubber body.

As is described above, the essential ingredients in the invention foamable silicone rubber composition include the components (a) to (g), of which the components (a), (b), (f) and (g) are rather conventional as the constituents of a foamable silicone rubber composition while the cellular silicone rubber body obtained by foaming and curing the composition can be imparted with excellent fire resistance by virtue of the synergistic effect obtained by the admixture of the unique components (c), (d) and (e) in combination.

As is the case in silicone rubber compositions in general, the base ingredient in the inventive foamable silicone rubber composition is also a diorganopolysiloxane as the component (a) which is represented by the above given average unit formula (I). In this formula, R denotes an unsubstituted or substituted monovalent hydrocarbon group having 1 to 10 or, preferably, 1 to 8 carbon atoms exemplified by alkyl groups, e.g., methyl, ethyl, propyl and butyl groups, cycloalkyl groups, e.g., cyclohexyl group, alkenyl groups, e.g., vinyl, allyl, butenyl and hexenyl groups, and aryl groups, e.g., phenyl and tolyl groups, as well as those substituted hydrocarbon groups obtained by replacing a part or all of the hydrogen atoms in the above named hydrocarbon groups with halogen atoms, cyano groups and the like, e.g., chlormethyl, 3,3,3-trifluoropropyl and 2-cyanoethyl groups. Preferably, all or at least 45% by moles of the organic groups denoted by R are methyl groups. The subscript a in the formula (I) is a positive number of 1.98 to 2.02. This limitation means that the diorganopolysiloxane has a substantially linear molecular structure. The terminal group blocking each of the chain ends of the molecules is not particularly limitative including trimethyl silyl group, dimethyl phenyl silyl group, dimethyl hydrogen silyl group, dimethyl vinyl silyl group, trivinyl silyl group and the like. Though not particularly limitative, the diorganopolysiloxane as the component (a) should have a viscosity of at least 100 centistokes or, preferably, from 100,000 to 10,000,000 centistokes at 25° C.

The diorganopolysiloxane suitable as the component (a) in the inventive composition is a material well known in the art of silicones. It is prepared, for example, by (co)hydrolyzing one or a mixture of two kinds or more of organohalogenosilanes followed by silanol condensation reaction of the (co)hydrolyzate. Alternatively, it can be prepared by the ring-opening polymerization of a cyclic diorganosiloxane oligoner such as trimers and tetramers in the presence of an acidic or alkaline catalyst. It is of course optional that the component (a) is a combination of two kinds or more of diorganopolysiloxanes having different characteristics.

The component (b) in the inventive silicone rubber compostion is a finely divided reinforcing silica filler which is essential in order to impart excellent mechanical properties to the silicone rubber obtained by curing the composition. It is important that the reinforcing silica filler should have a specific surface area of at least 50 m²/g or, preferably, at least 100 m²/g in order that the desired reinforcing effect can be fully exhibited. Various grades of reinforcing silica filler products are commercially available including so-called fumed and precipitated silica fillers.

The amount of the reinforcing silica filler in the inventive composition is in the range from 10 to 70 parts by weight or, preferably, from 30 to 50 parts by weight per 100 parts by weight of the diorganopolysiloxane as the component (a). When the amount of the reinforcing filler is too small, the desired reinforcing effect can hardly be obtained as a matter of course. When the amount thereof is too large, on the other hand, difficulties are encountered in the compounding work of the components into a composition in addition to the poor workability of the composition, if it ever could be obtained, and the low mechanical properties of the silicone rubber body obtained by curing.

The component (c) in the inventive silicone rubber composition is a ferrite in the form of a powder. This component is essential as a fire-resistance improver which greatly decreases expansion or shrinkage of the cellular silicone rubber body obtained by curing the inventive composition in the temperature range of 400° to 600° C. and also to reduce the shrinkage of the body at a temperature higher than 600° C. The ferrite here implied is a composite metal oxide having a chemical composition represented by the general formula $MO \cdot Fe_2O_3$, in which M is a divalent metallic element selected from the group consisting of manganese, copper, nickel, magnesium, cobalt, zinc and iron. Two kinds or more of these divalent metallic elements can be contained in combination in the ferrite. Examples of suitable ferrites include those expressed by the following formulas:

$$(MnO)_{0.5}(ZnO)_{0.5}Fe_2O_3,$$

$$(NiO)_{0.5}(ZnO)_{0.5}Fe_2O_3,$$

$$(MgO)_{0.5}(MnO)_{0.5}Fe_2O_3,$$

$$(MnO)_{0.5}(FeO)_{0.5}Fe_2O_3,$$

$$(MnO)_{0.64}(ZnO)_{0.28}(FeO)_{0.08}Fe_2O_3,$$

$$(MnO)_{0.30}(ZnO)_{0.70}Fe_2O_3,$$

$$FeO \cdot Fe_2O_3,$$

and the like through not particularly limitative thereto. The ferrite powder as the component (c) should have an average particle diameter in the range from 0.01 to 15 μm or, preferably, from 0.1 to 5 μm.

The amount of the ferrite powder as the component (c) in the inventive silicone rubber composition is in the range from 20 to 150 parts by weight or, preferably, from 50 to 90 parts by weight per 100 parts by weight of the diorganopolysiloxane as the component (a). When the amount of the ferrite powder is too small, the fire resistance of the composition after curing cannot be high enough. When the amount thereof is too large, on the other hand, adverse influences would be caused on the mechanical properties of the cellular silicone rubber body obtained by curing the composition.

An additional advantage is obtained by the admixture of a ferrite powder in the silicone rubber composition. Since ferrites in general are good absorbers of the energy of microwaves or ultrahigh-frequency electromagnetic waves, namely, the silicone rubber composition compounded with a substantial amount of a ferrite powder can be heated up when it is irradiated with microwaves to reach a temperature at which curing of the composition can be effected throughout the body even without any external heating means. Therefore, the composition extruded out of an extruder machine is continuously brought into a field of microwaves in a chamber where the extruded body of the composition can be cured by the so-called UHF vulcanization continuously and efficiently in a high productivity.

The component (d) compounded in the inventive foamable silicone rubber composition is a finely divided particulate, flaky or fibrous inorganic material selected from the group consisting of flakes of mica or sericite, fibers of ceramics and glass powders. This component works as a shape retainer of the cured composition when the cellular cured silicone rubber body is exposed to an atmosphere of a high temperature or to flames preventing formation of cracks and falling of the body. The amount of this component should be in the range from 3 to 200 parts by weight per 100 parts by weight of the diorganopolysiloxane as the component (a) although the preferable amount thereof depends on the types of the material.

A class of the materials as the component (d) includes flakes of mica, such as muscovite, biotite, phlogopite and the like, or sericite. The flakes should have an average diameter in the range from 1 μm to 1 mm or, preferably, from 5 μm to 50 μm and a thickness in the range from 0.01 μm to 100 μm or, preferably, from 0.05 μm to 5 μm. As to the aspect ratio, i.e. the ratio of the largest diameter within the plane of the flake to the thickness, of the flake, it was found that the aspect ratio should be as large as possible or at least 10 in order to exhibit good reinforcing effect and to effectively decrease the expansion and shrinkage of the cellular silicone rubber body when it is heated at 400° to 600° C.

A preferable amount of addition of the mica or sericite flakes to the inventive composition is in the range from 15 to 50 parts by weight or, more preferably, from 20 to 40 parts by weight per 100 parts by weight of the diorganopolysiloxane as the component (a). When the amount of the flakes is too small, sufficiently high fire resistance cannot be imparted to the cellular cured silicone rubber body obtained from the composition. When the amount thereof is too large, on the other hand, adverse influences are caused on the mechanical properties of the cellular cured silicone rubber body.

Another class of the materials as the component (d) in the inventive silicone rubber composition includes fibers and whiskers of a ceramic material. The component (d) of this type is particularly effective in preventing crack formation when the cellular cured silicone rubber body obtained from the inventive composition is exposed to a high-temperature atmosphere in which heavy cracks are formed otherwise. Examples of suitable ceramic fibers or whiskers include: alumina fibers, silica fibers, silica.alumina fibers, zirconia fibers, silicon carbide fibers, zinc oxide fibers and whiskers of various kinds of composite oxides such as alkali titanates of the formulas $Na_2TiO_3$, $Na_2Ti_2O_5$, $Na_2Ti_4O_9$, $Na_2Ti_6O_{13}$, $K_2TiO_3$, $K_2Ti_2O_5$, $K_2Ti_4O_9$, $K_2Ti_6O_{13}$, $K_2Ti_8O_{17}$ and the like as well as calcium sodium metaphosphate of the formula $2CaO.Na_2O.3P_2O_5$.

The component (d), when it is in a fibrous form, should have a diameter of the filaments not to exceed 50 μm or, preferably, in the range from 2 to 20 μm and a length of each filament of at least 3 μm or, preferably, at least 10 μm. Although the reinforcing effect exhibited by the fibrous component (d) is increased as the diameter of the filaments is decreased and as the length of the filaments is increased, these parameters are limited as mentioned above due to the possible carcinogenicity responsible for lung cancers or malignant mesotheliomas in human body. In particular, the length of the filaments should not be excessively large because an extreme decrease is caused in the workability of a silicone rubber composition compounded with such a fibrous material. The aspect ratio of the filaments, i.e. the ratio of the length to the diameter, should be at least 6 or, preferably, from 6 to 200.

A preferable amount of addition of the component (d), when it is in a fibrous form, to the inventive composition is in the range from 3 to 70 parts by weight or, more preferably, from 10 to 50 parts by weight per 100 parts by weight of the diorganopolysiloxane as the component (a). When the amount thereof is too small, sufficiently high fire resistance cannot be imparted to the cellular cured silicone rubber body obtained from the composition by preventing crack formation in fire. When the amount thereof is too large, on the other hand, adverse influences are caused on the mechanical properties of the cellular cured silicone rubber body in addition to the difficulty encountered in the compounding works.

The third class of the component (d) includes powders of glass which serve as a shape retainer of the silicone rubber body and also as a surface protecting agent. According to the results of the thermomechanical analysis of a cured silicone rubber body compounded with a substantial amount of a glass powder, thermal expansion or shrinkage of the rubber body in the range of 400° to 600° C. can be greatly decreased so that the silicone rubber body can be prevented from crack formation and deformation in fire. Powders of various kinds of glass can be used for the purpose including those based on silicates, borates and phosphates. The glass powder should have a melting point in the range from 300° to 1000° C. or, preferably, from 400° to 700° C. In particular, satisfactory results can be obtained by using frits for glazing glazed ironwares or cloisonne works. The glass powder as the component (d) should have an average particle diameter in the range from 0.1 to 100 μm.

A preferable amount of addition of the component (d), when it is a glass powder, to the inventive composition is in the range from 20 to 200 parts by weight or, more preferably, from 30 to 150 parts by weight per 100 parts by weight of the diorganopolysiloxane as the component (a). When the amount thereof is too small, sufficiently high fire resistance cannot be imparted to the cellular cured silicone rubber body obtained from the composition by preventing crack formation in fire. When the amount thereof is too large, on the other hand, adverse influences are caused on the mechanical properties of the cellular cured silicone rubber body.

The component (e) in the inventive foamable silicone rubber composition is platinum metal in a finely divided form or a platinum compound which serves as a flame retardant agent so as to greatly decrease the rate of combustion of the cellular cured silicone rubber body at a temperature in the range of 400° to 600° C. and also to decrease expansion or shrinkage of the cellular cured silicone rubber body according to the results of the thermomechanical analysis.

Suitable platinum material as the component (e) include chloroplatinum acids, i.e. chloroplatinous acid $H_2PtCl_4$ and chloroplatinic acid $H_2PtCl_6$, and complexes of chloroplatinic acid with an alcohol, aldehyde, ether or olefin as well as elementary platinum such as platinum black. The amount of the component (e) in the inventive foamable silicone rubber composition is in the range from 1 to 2000 ppm by weight as platinum metal based on the amount of the diorganopolysiloxane as the component (a).

The component (f) in the inventive silicone rubber composition is a curing agent to effect curing of the composition. Various types of curing agents are known and can be used depending on the mechanism of the crosslinking reaction. For example, organic peroxides are useful to cause crosslinking between the hydrocarbon groups bonded to the silicon atoms of the diorganopolysiloxane molecules. Examples of suitable organic peroxides include benzoyl peroxide, 2,4-dichlorobenzoyl peroxide, 4-chlorobenzoyl peroxide, 4-methylbenzoyl peroxide, dicumyl peroxide, 2,5-dimethyl-bis-(2,5-tert-butylperoxy) hexane, di-tert-butyl peroxide, tert-butyl perbenzoate and the like. When these organic peroxides are compounded in the inventive composition as the curing agent, the amount thereof should be in the range from 0.5 to 5 parts by weight per 100 parts by weight of the diorganopolysiloxane as the component (a) or in the range from 0.1 to 1.0 part by weight per 100 parts by weight of the composition.

When the diorganopolysiloxane as the component (a) has a silanolic hydroxy group at each molecular chain end, the crosslinking reaction to effect curing of the composition can proceed by the condensation reaction between the silanolic hydroxy groups and silanolic hydroxy or hydrolyzable groups in an organosilicon compound admixed to serve as a crosslinking agent. Various hydrolyzable groups are known including alkoxy, acyloxy, alkenyloxy, iminoxy, amino, amido and aminoxy groups to pertain to the condensation reaction by dehydration, dealcoholation, decarboxylation, deketonation, deoximation, deamination, deamidation and the like. Examples of the organosilicon compound to serve as the crosslinking agent include those having, in a molecule, at least three hydrolyzable groups such as alkoxy groups, oxime groups, acyloxy groups and the like such as methyl trialkoxy silanes, ethyl trialkoxy silanes, vinyl trialkoxy silanes, phenyl trialkoxy silanes, tetraalkoxy silanes, methyl tributanoxime silane, methyl trihexanoxime silane, methyl tri(isopropenyloxy) silane, methyl triacetoxy silane and the like. The condensation reaction can be promoted by various kinds of catalytic compounds including organic tin compounds such as dibutyltin dilaurate and tin dioctoate, metal salts of fatty acids such as iron stearate and lead octoate, titanate ester compounds such as titanium tetrapropoxide and titanium tetrabutoxide, amine compounds such as dibutyl amine and triethanolamine, and so on.

When the diorganopolysiloxane as the component (a) has at least two alkenyl, e.g., vinyl, groups in a molecule, furthermore, the curing agent or crosslinking agent as the component (f) can be an organohydrogenpolysiloxane having at least two hydrogen atoms directly bonded to the silicon atoms in a molecule which pertains to the addition reaction or so-called hydrosilation reaction with the alkenyl groups in the component (a). The molecular structure of the organohydrogenpolysiloxane is not particularly limitative including straightly linear, branched and cyclic ones. The organohydrogenpolysiloxane can be a diorganopolysiloxane blocked at each molecular chain end with a dimethyl hydrogen silyl group, copolymeric organopolysiloxane composed of dimethyl siloxane units, methyl hydrogen siloxane units and trimethyl siloxy groups as the terminal groups at the molecular chain ends, low-viscosity organopolysiloxane composed of monofunctional dimethyl hydrogen siloxy units $(CH_3)_2HSiO_{0.5}$ and tetrafunctional siloxane units $SiO_2$, 1,3,5,7-tetramethyl cyclotetrasiloxane, 1,3,5,7-tetramethyl-1-propyl cyclotetrasiloxane, 1,3,5,7-tetramethyl-1,5-dihexyl cyclotetrasiloxane and the like. The organohydrogenpolysiloxane should have an average degree of polymerization not exceeding 300. The amount of the organohydrogenpolysiloxane as the crosslinking agent in the inventive composition should be sufficient to provide from 0.5 to 5 moles of the silicon-bonded hydrogen atoms per mole of the alkenyl groups in the component (a). As is known, the addition reaction between the alkenyl groups and the silicon-bonded hydrogen atoms can be promoted by a catalytic activity of a platinum compound. Since the inventive silicone rubber composition contains a platinum compound as an essential component (e), no additional amount of a platinum compound usually need be added even when curing of the composition is desired to proceed by the addition reaction. In other words, the platinum compound added as the component (e) serves both as a flame retardant and as a catalyst for promoting the addition reaction.

The component (g) in the inventive foamable silicone rubber composition is a blowing agent which is a compound stable at room temperature but decomposable at an elevated temperature to produce a foaming gas such as nitrogen, carbon dioxide and the like. Various compounds are known as a blowing agent in the prior art and can be used here without particular limitations. Examples of suitable blowing agents include azobisisobutyronitrile, dinitroso pentamethylene tetramine, benzenesulfone hydrazide, N,N'-dinitroso-N,N'-dimethyl terephthalamide, azodicarbonamide and the like. The amount of the blowing agent as the component (g) added to the inventive composition naturally depends on the desired degree of foaming. It is, however, usual that the amount of the blowing agent is in the range from 1 to 10 parts by weight or, in most cases, from 3 to 7 parts by weight per 100 parts by weight of the diorganopolysiloxane as the component (a). When the amount of the blowing agent is too small, no full development of the cellular structure can be obtained in the cellular cured silicone rubber body as a matter of course. When the amount thereof is too large, on the other hand, the cellular structure of the cured silicone rubber body would be too coarse so that the silicone rubber body could not serve as an effective fire-resistant joint-sealing material.

The foamable silicone rubber composition of the present invention can be prepared by uniformly blending the above described essential components (a) to (g) each in a specified amount by using a suitable rubber processing machine such as two-roller mills, Banbury mixers, dough mixers and the like. The order for blending the components is not particularly limitative but it is usual that the components (a) and (b) are first blended together to form a uniform blend to which the other components are added and further kneaded. It is of course optional that the composition is further admixed with various kinds of known additives. In particular, further reduction of expansion or shrinkage of the cellular cured silicone rubber body can be obtained by the admixture of the composition with up to 100 parts by weight or, usually, from 20 to 50 parts by weight of a quartz powder having an average particle diameter in the range from 0.01 to 20 $\mu$m or, preferably, from 0.1 to 10 $\mu$m per 100 parts by weight of the diorganopolysiloxane as the component (a).

The other optional additives added to the composition according to need include coloring agents, heat-resistance improvers, reaction moderators, mold-release agents, dispersion aids for the filler, such as diphenylsilane diol, various kinds of alkoxy silanes, carbon-functional silanes, silanol group-containing low molecular-weight organopolysiloxanes and the like, and so on each in a limited amount not to cause any adverse influences on the properties of the inventive silicone rubber composition as well as the cellular cured silicone rubber body obtained therefrom.

The foamable silicone rubber composition of the invention prepared in the above described manner can be shaped and cured into a cellular cured silicone rubber body by any conventional molding means used in shaping and curing silicone rubber compositions including cast-molding, compression molding in metal molds, extrusion molding, coating on various substrates and the like. In order that the thus obtained cellular cured silicone rubber body may have high fire resistance, it is preferable that the ratio of foaming expansion is in the range from 200% to 800% which can be achieved by adequately selecting the amount of the blowing agent. In this regard, the most preferable molding method is the above mentioned extrusion molding. Namely, continuous extrusion of the composition out of the extruder die is followed by curing by heating the extruded composition in the normal-pressure hot-air vulcanization method, continuous steaming vulcanization method, continuous fused-salt vulcanization method, UHF vulcanization method and the like, of which the UHF vulcanization method is preferable because the extruded body of the composition can be heated evenly throughout the body. Namely, the continuous-length extruded body of the composition is continuously introduced into a microwave chamber in which it is irradiated with microwaves of a frequency of 2450±50 MHz or 915±25 MHz so that the energy of the microwaves is efficiently absorbed by the ferrite powder and converted into heat to increase the temperature of the body up to a temperature at which foaming and curing of the composition can proceed. In this manner, cellular cured silicone rubber bodies having any desired thickness, such as gaskets and insulators in buildings, rubber rollers in office-automation instruments and the like, can be continuously produced with stability and low costs.

In the following, the foamable silicone rubber composition of the present invention is described in more detail by way of examples and comparative examples, in which the term of "parts" always refers to "parts by weight". The cellular silicone rubber bodies obtained in the experiments were evaluated as a fire-resistant material in the following manner.

Thus, the cellular silicone rubber bodies as the test sample shaped in the form of a joint-sealing member were subjected to the heat-resistance test under the conditions specified in JIS A 1304, Articles 3 to 5 and the results were evaluated according to the evaluation criteria of Article 5.10 for the following items. When these criteria were satisfied, the cellular silicone rubber body was found acceptable as a fire-resistant building material.

i) The temperature of the joint-sealing member on the back surface should not exceed 260° C.

ii) Any changes, such as deformation, breaking, falling and the like, possibly having an adverse influence on the structural yield strength are not found throughout the heating test.

iii) No cracks are formed which may allow flames to pass therethrough.

iv) Flaming on the joint-sealing member is not remarkable during heating and, if a flame rises on the member, no fire is left unextinguished after 10 minutes from termination of heating.

EXAMPLE 1

A base compound was prepared by uniformly blending, on a two-roller mill, 100 parts of a gum-like diorganopolysiloxane consisting of 99.825% by moles of dimethyl siloxane units, 0.15% by moles of methyl vinyl siloxane units and 0.025% by moles of dimethyl vinyl siloxy groups at the molecular chain ends and having an average degree of polymerization of about 8000, 3 parts of diphenylsilane diol, 4 parts of a low molecular-weight dimethylpolysiloxane having a degree of polymerization of 10 and terminated at each molecular chain end with a silanolic hydroxy group and 40 parts of a fumed silica filler having a specific surface area of 200 $m^2/g$ (Aerosil 200, a product by Nippon Aerosil Co.) followed by a heat treatment of the mixture at 150° C. for 4 hours.

A foamable silicone rubber composition, referred to as the Composition I hereinbelow, was prepared by compounding, on a two-roller mill, a 100 parts portion of the thus prepared base compound with 70 parts of a powder of ferrite having a chemical composition of the formula $(MnO)_{0.30}(ZnO)_{0.70}Fe_2O_3$ and having an average particle diameter of 3 μm, 30 parts of fine mica flakes having an average diameter of 30 μm, thickness of 1 μm and aspect ratio of 30, chloroplatinic acid in an amount of 100 ppm by weight as platinum based on the gum-like diorganopolysiloxane, 25 parts of a quartz powder having an average particle diameter of 0.5 μm, each 0.5 part of 2,4-dichloro-benzoyl peroxide and dicumyl peroxide as the curing agent and 2 parts of azobisisobutyronitrile as the blowing agent.

A second foamable silicone rubber composition, referred to as the Composition II hereinbelow, was prepared in the same formulation as for the Composition I described above excepting replacement of the ferrite powder with the same amount of another ferrite powder having a chemical composition of the formula $FeO.Fe_2O_3$ and an average particle diameter of 3 μm.

A third foamable silicone rubber composition, referred to as the Composition III hereinbelow, was prepared in the same formulation as for the Composition I above excepting omission of the quartz powder.

A fourth foamable silicone rubber composition, referred to as the Composition IV hereinbelow, was prepared in the same formulation as for the Composition II above excepting omission of the quartz powder.

A fifth foamable silicone rubber composition, referred to as the Composition V hereinbelow, was prepared in the same formulation as for the Composition I above excepting omission of the ferrite powder and increase of the amount of the quartz powder from 25 parts to 70 parts.

A sixth foamable silicone rubber composition, referred to as the Composition VI hereinbelow, was prepared in the same formulation as for the Composition I above excepting omission of the ferrite powder, mica flakes, platinum compound and quartz powder.

A seventh foamable silicone rubber composition, referred to as the Composition VII hereinbelow, was prepared in the same formulation as for the Composition V above excepting further omission of the mica flakes.

An eight foamable silicone rubber composition, referred to as the Composition VIII hereinbelow, was prepared in the same formulation as for the Composition I above excepting omission of both of the mica flakes and the quartz powder.

A ninth foamable silicone rubber composition, referred to as the Composition IX hereinbelow, was prepared in the same formulation as for the Composition I above excepting a decrease of the amount of the mica flakes to 10 parts and omission of the quartz powder.

A tenth foamable silicone rubber composition, referred to as the Composition X hereinbelow, was prepared in the same formulation as for the Composition II above excepting omission of both of the mica flakes and the quartz powder.

Each of the thus prepared 10 foamable silicone rubber compositions I to X was introduced into a first extruder machine with a cylinder barrel having an outer diameter of 40 mm, inner diameter of 10 mm and a ratio of the length to the diameter L/D of 12 and equipped with a die having an outer diameter of 20 mm and inner diameter of 10 mm. The composition thoroughly milled in the first extruder machine was then transferred therefrom to a second extruder machine equipped with a die of 5 mm diameter opening at 15° to 30° C. and extruded therefrom at 15° to 30° C. at a rate of 1 meter per minute into a continuous-length rod of 5 mm diameter which was continuously introduced into a curing oven of 12 meter long and irradiated therein with microwaves of 2 kW output at a frequency of 2450 MHz under circulation of hot air at 200° C. through the oven to effect foaming and curing of the composition. The continuous-length rod of the foamed composition was then subjected to a post-curing treatment by keeping for 4 hours in a hot air-circulation oven at 200° C. to complete curing. The thus obtained foamed and cured silicone rubber rods had a diameter of 20 to 30 mm. Table 1 below also shows the ratio of expansion by foaming in % by volume.

The continuous-length foamed and cured silicone rubber rod was cut into 20 cm long rods which were subjected to the fire-resistance test according to the procedure specified in JIS A 1304. As is illustrated in FIG. 1 by a perspective view, the rod-like test piece 1 was sandwiched with two plates 2 of cement mortar each having a length of 20 cm, width of 5 cm and thickness of 1 cm and fixed therebetween by means of metal clamps (not shown in the figure) to give a test sample assembly 3 which was heated in an electric furnace by increasing the temperature from room temperature to 800° C. taking 30 minutes at a constant rate and then kept in the furnace for additional 150 minutes at 800° C. After cooling to room temperature, the silicone rubber rod was taken out and examined for the changes in the outer appearance relative to the items ii), iii) and iv) specified before to give the results shown in Table 1, in which G means that the test specimen could pass the test and NG means that the test specimen failed to pass the test.

Figure 2:
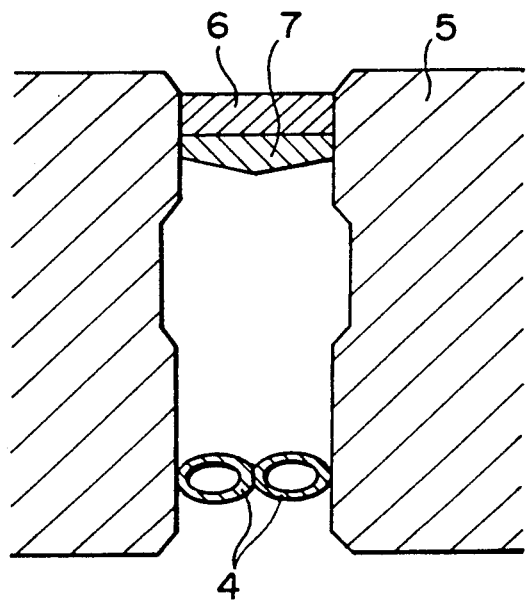
FIG. 2 is a cross sectional view of a joint-sealing member filling a joint gap of substrates in the joint-sealing test for fire-resistance of structural parts of buildings according to the procedure specified in JIS A 1304.
Figure 3:
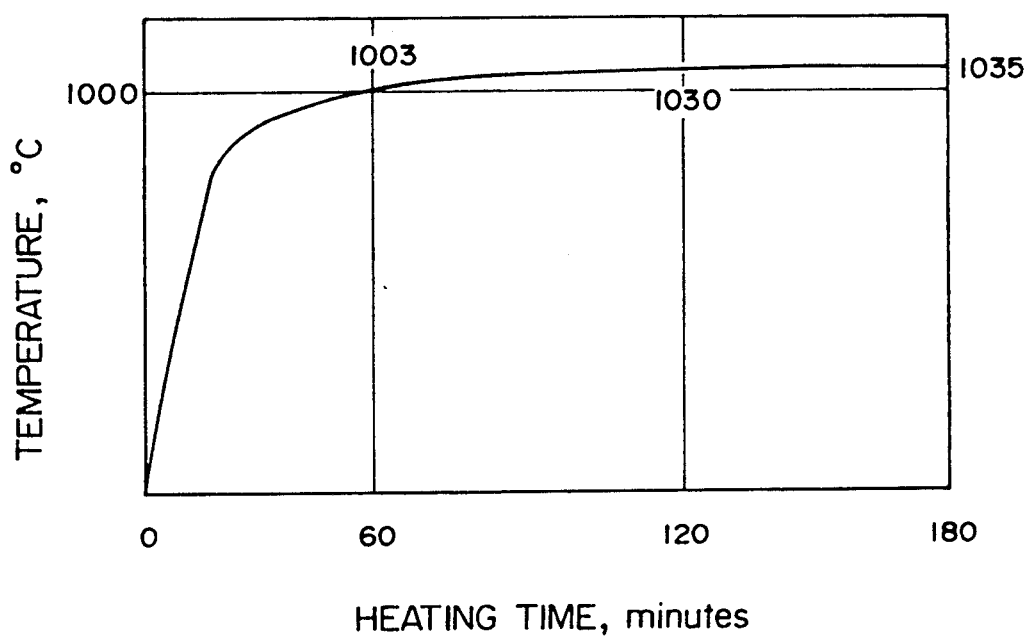
FIG. 3 is a graph showing the schedule of temperature elevation in the joint-sealing test for fire-resistance of the joint-sealing member according to JIS A 1304.

Further, the foamed and cured silicone rubber rod was subjected to the joint-sealing test for fire resistance according to the procedure specified in JIS A 1304. As is illustrated in FIG. 2 by a cross section, a silicone rubber gasket 4 having a cross section illustrated in the figure with a width of 2.5 cm was prepared from the foamed and cured silicone rubber rod and sandwiched between two ALC (autoclaved light-weight concrete) slabs 5 each having a thickness of 15 cm together with a sealing member 7 made from a foamed polyvinyl chloride resin and a joint sealing 6 of a room temperature-curable silicone sealant composition. The gasket 4 between the ALC slabs was heated from below according to JIS A 1304, Articles 3 to 5 in a schedule of temperature elevation graphically shown in FIG. 3 and the results were evaluated for the items i), ii), iii) and iv) to give the results also shown in Table 1 with the symbols of G or NG.

EXAMPLE 2

A first foamable silicone rubber composition, referred to as the Composition XI hereinbelow, was prepared by compounding, on a two-roller mill, a 147 parts portion of the base compound prepared in Example 1 with 70 parts of a powder of a ferrite having a chemical composition of the formula $(MnO)_{0.30}(ZnO)_{0.70}Fe_2O_3$ and having an average particle diameter of 3 $\mu$m, 25 parts of a quartz powder having an average particle diameter of 5 $\mu$m, 100 parts of alumina fibers having a diameter of 10.0 $\mu$m and aspect ratio of 100, the same platinum compound as used in Example 1 in an amount of 100 ppm by weight as platinum based on the gum-like diorganopolysiloxane, each 0.5 part of 2,4-dichlorobenzoyl peroxide and dicumyl peroxide as the curing agent and 2 parts of azobisisobutyronitrile as the blowing agent.

A second foamable silicone rubber composition, referred to as the Composition XII hereinbelow, was prepared in the same formulation as for the Composition XI described above excepting omission of the quartz powder.

A third foamable silicone rubber composition, referred to as the Composition XIII hereinbelow, was prepared in the same formulation as for the Composition XI described above excepting replacement of the alumina fibers with the same amount of silicon carbide fibers having a diameter of 7.0 $\mu$m and an aspect ratio of 157.

A fourth foamable silicone rubber composition, referred to as the Composition XIV hereinbelow, was prepared in the same formulation as for the Composition XI described above excepting replacement of the alumina fibers with the same amount of silicon carbide fibers of another grade having a diameter of 10.0 $\mu$m and an aspect ratio of 50.

A fifth foamable silicone rubber composition, referred to as the Composition XV hereinbelow, was prepared in the same formulation as for the Composition XI described above excepting replacement of 30 parts of the alumina fibers with 15 parts of potassium titanate whiskers having a diameter of 0.5 $\mu$m and an aspect ratio of 40.

A sixth foamable silicone rubber composition, referred to as the Composition XVI hereinbelow, was prepared in the same formulation as for the Composition XV described above excepting omission of the quartz powder.

A seventh foamable silicone rubber composition, referred to as the Composition XVII hereinbelow, was prepared in the same formulation as for the Composition XV described above excepting replacement of the potassium titanate whiskers with the same amount of zinc oxide whiskers having a diameter of 3.0 $\mu$m and an aspect ratio of 7.

An eight foamable silicone rubber composition, referred to as the Composition XVIII hereinbelow, was prepared in the same formulation as for the Composition XI described above excepting replacement of 30 parts of the alumina fibers with 15 parts of phosphate fibers having a diameter of 5.0 $\mu$m and an aspect ratio of 10.

A ninth foamable silicone rubber composition, referred to as the Composition XIX hereinbelow, was prepared in the same formulation as for the Composition XI described above excepting replacement of the alumina fibers with the same amount of silica.alumina fibers having a diameter of 0.5 μm and an aspect ratio of 5.

A tenth foamable silicone rubber composition, referred to as the Composition XX hereinbelow, was prepared in the same formulation as for the Composition XI described above excepting omission of the alumina fibers.

An eleventh foamable silicone rubber composition, referred to as the Composition XXI hereinbelow, was prepared in the same formulation as for the Composition XI described above excepting omission of both of the quartz powder and the alumina fibers.

A twelfth foamable silicone rubber composition, referred to as the Composition XXII hereinbelow, was prepared in the same formulation as for the Composition XIX described above excepting a decrease of the amount of the silica.alumina fibers to 10 parts.

A thirteenth foamable silicone rubber composition, referred to as the Composition XXIII hereinbelow, was prepared in the same formulation as for the Composition XI described above excepting omission of the ferrite powder, quartz powder and alumina fibers.

A fourteenth foamable silicone rubber composition, referred to as the Composition XXIV hereinbelow, was prepared in the same formulation as for the Composition XI described above excepting a decrease of the amount of the ferrite powder to 15 parts and omission of the alumina fibers.

A fifteenth foamable silicone rubber composition, referred to as the Composition XXV hereinbelow, was prepared in the same formulation as for the Composition XX described above excepting additional admixture of 2 parts of the same potassium titanate whiskers as used in the Composition XV described above.

Each of these 15 foamable silicone rubber compositions, i.e. Compositions XI to XXV, was subjected to the same tests as in Example 1 to give the results shown in Table 1 together with the ratio of foaming expansion in % by volume.

EXAMPLE 3

A first foamable silicone rubber composition, referred to as the Composition XXVI hereinbelow, was prepared by compounding, on a two-roller mill, a 147 parts portion of the base compound prepared in Example 1 with 30 parts of a powder of a ferrite having a chemical composition of the formula $(MnO)_{0.30}(ZnO)_{0.70}Fe_2O_3$ and having an average particle diameter of 3 μm, 50 parts of a phosphate frit having an average particle diameter of 10 μm and a melting point of 390° C., the same platinum compound as used in Example 1 in an amount of 100 ppm by weight as platinum based on the gum-like diorganopolysiloxane, each 0.5 part of 2,4-dichlorobenzoyl peroxide and dicumyl perox-ide as the curing agent and 2 parts of azobisisobutyronitrile as the blowing agent.

A second foamable silicone rubber composition, referred to as the Composition XXVII hereinbelow, was prepared in the same formulation as for the Composition XXVI described above excepting replacement of the phosphate frit with the same amount of a borosilicate frit having an average particle diameter of 10 μm and a melting point of 480° C.

A third foamable silicone rubber composition, referred to as the Composition XXVIII hereinbelow, was prepared in the same formulation as for the Composition XXVI described above excepting replacement of the phosphate frit with the same amount of a lead borosilicate frit having an average particle diameter of 10 μm and a melting point of 560° C.

A fourth foamable silicone rubber composition, referred to as the Composition XXIX hereinbelow, was prepared in the same formulation as for the Composition XXVI described above excepting omission of the phosphate frit.

A fifth foamable silicone rubber composition, referred to as the Composition XXX hereinbelow, was prepared in the same formulation as for the Composition XXVI described above excepting omission of both of the ferrite powder and the phosphate frit.

A sixth foamable silicone rubber composition, referred to as the Composition XXXI hereinbelow, was prepared in the same formulation as for the Composition XXVII described above excepting a decrease in the amount of the borosilicate frit to 10 parts.

Each of these 6 foamable silicone rubber compositions, i.e. Compositions XXVI to XXXI, was subjected to the same tests as in Example 1 to give the results shown in Table 1 together with the ratio of foaming expansion in % by volume.

TABLE 1

| Composition No. | Ratio of expansion, % | Fire-resistance test (ii) | (iii) | (iv) | Joint-sealing test (i) | (ii) | (iii) | (iv) |
|---|---|---|---|---|---|---|---|---|
| I | 400 | G | G | G | G | G | G | G |
| II | 480 | G | G | G | G | G | G | G |
| III | 490 | G | G | G | G | G | G | G |
| IV | 510 | G | G | G | G | G | G | G |
| V | 100? | NG | NG | G | — | — | — | — |
| VI | 350 | NG | NG | NG | — | — | — | — |
| VII | 380 | NG | NG | G | NG | NG | NG | G |
| VIII | 420 | NG | NG | G | NG | NG | NG | G |
| IX | 430 | G | NG | G | G | G | NG | G |
| X | 430 | NG | NG | G | NG | NG | NG | G |
| XI | 400 | G | G | G | G | G | G | G |
| XII | 480 | G | G | G | G | G | G | G |
| XIII | 490 | G | G | G | G | G | G | G |
| XIV | 510 | G | G | G | G | G | G | G |
| XV | 400 | G | G | G | G | G | G | G |
| XVI | 480 | G | G | G | G | G | G | G |
| XVII | 490 | G | G | G | G | G | G | G |
| XVIII | 510 | G | G | G | G | G | G | G |
| XIX | 400 | NG | NG | G | NG | NG | NG | G |
| XX | 450 | NG | NG | G | NG | NG | NG | G |
| XXI | 420 | NG | NG | G | NG | NG | NG | G |
| XXII | 430 | G | NG | G | G | G | NG | G |
| XXIII | 430 | NG | NG | G | — | — | — | — |
| XXIV | 400 | NG | NG | G | — | — | — | — |
| XXV | 430 | G | NG | G | G | G | NG | G |
| XXVI | 500 | G | G | G | G | G | G | G |
| XXVII | 520 | G | G | G | G | G | G | G |
| XXIII | 530 | G | G | G | G | G | G | G |
| XXIX | 480 | NG | NG | G | NG | NG | NG | G |
| XXX | 480 | NG | NG | G | NG | NG | NG | G |
| XXXI | 500 | NG | G | G | NG | NG | G | G |

What is claimed is:

1. A foamable silicone rubber composition which comprises, as a blend:
   (a) 100 parts by weight of a diorganopolysiloxane represented by the average unit formula $$R_aSiO_{(4-a)/2},$$

in which R is an unsubstituted or substituted monovalent hydrocarbon group and the subscript a is a positive number of 1.98 to 2.02;
(b) from 10 to 70 parts by weight of a finely divided reinforcing silica filler having a specific surface area of at least 50 m²/g;
(c) from 20 to 150 parts by weight of a powder of a ferrite having a chemical composition expressed by the general formula $$MO \cdot Fe_2O_3,$$

in which M denotes a divalent metallic element selected from the group consisting of manganese, copper, nickel, magnesium, cobalt, zinc and iron;
(d) from 10 to 70 parts by weight of a finely divided inorganic material in a particulate, flaky or fibrous form selected from the group consisting of flakes of mica or sericite, fibers of ceramics and glass powders;
(e) finely divided platinum metal or a platinum compound in an amount in the range from 1 to 2000 ppm by weight as platinum metal based on the diorganopolysiloxane as the component (a);
(f) a curing agent of silicone rubbers in an amount sufficient to cure the composition; and
(g) a blowing agent in an amount sufficient to produce a cellular structure of the composition by curing.

2. The foamable silicone rubber composition as claimed in claim 1 in which the powder of a ferrite has an average particle diameter in the range from 0.01 to 15 μm.

3. The foamable silicone rubber composition as claimed in claim 1 in which the curing agent is an organic peroxide.

4. The foamable silicone rubber composition as claimed in claim 3 in which the amount of the organic peroxide is in the range from 0.5 to 5 parts by weight per 100 parts by weight of the diorganopolysiloxane as the component (a).

5. The foamable silicone rubber composition as claimed in claim 1 in which the finely divided inorganic material is in a flaky form and selected from the group consisting of mica flakes and sericite flakes.

6. The foamable silicone rubber composition as claimed in claim 5 in which the mica flakes or sericite flakes have an aspect ratio of at least 10.

7. The foamable silicone rubber composition as claimed in claim 5 in which the amount of the mica flakes or sericite flakes is in the range from 15 to 70 parts by weight per 100 parts by weight of the diorganopolysiloxane as the component (a).

8. The foamable silicone rubber composition as claimed in claim 5 in which the mica flakes or sericite flakes have an average diameter in the range from 3 to 10 μm.

9. The foamable silicone rubber composition as claimed in claim 1 in which the finely divided inorganic material is in a fibrous form and selected from the group consisting of fibers and whiskers of a ceramic material.

10. The foamable silicone rubber composition as claimed in claim 9 in which the fibers or whiskers of a ceramic material have a diameter not exceeding 50 μm and a fiber length of at least 3 μm with an aspect ratio of at least 6.

11. The foamable silicone rubber composition as claimed in claim 9 in which the ceramic material in the form of fibers is selected from the group consisting of alumina, silica, silica.alumina, zirconia, silicon carbide and zinc oxide.

12. The foamable silicone rubber composition as claimed in claim 9 in which the ceramic material in the form of whiskers is selected from the group consisting of alkali titanates expressed by the chemical formulas of $Na_2TiO_3$, $Na_2Ti_2O_5$, $Na_2Ti_4O_9$, $Na_2Ti_6O_{13}$, $K_2TiO_3$, $K_2Ti_2O_5$, $K_2Ti_4O_9$, $K_2Ti_6O_{13}$ and $K_2Ti_8O_{17}$ and whiskers of calcium sodium metaphosphate and calcium sodium metaphosphate.

13. The foamable silicone rubber composition as claimed in claim 9 in which the amount of the fibers or whiskers of a ceramic material is in the range from 3 to 70 parts by weight per 100 parts by weight of the diorganopolysiloxane as the component (a).

14. The foamable silicone rubber composition as claimed in claim 1 in which the finely divided inorganic material is a glass powder.

15. The foamable silicone rubber composition as claimed in claim 14 in which the amount of the glass powder is in the range from 20 to 200 parts by weight per 100 parts by weight of the diorganopolysiloxane as the component (a).

16. The foamable silicone rubber composition as claimed in claim 14 in which the glass powder has an average partiocle diameter in the range from 0.1 to 100 μm.

17. The foamable silicone rubber composition as claimed in claim 14 in which the glass powder has a melting point in the range from 300° to 1000° C.

18. A silicone rubber body having a cellular structure which is a foamed and cured body of the foamable silicone rubber composition according to claim 1.

* * * * *